3,294,065
BIOCIDAL DEVICES
Thelma Myers, Solon, and Howard S. Webb, Conneaut, Ohio; said Myers assignor to Hudson Associates, Hudson, Ohio, a corporation of Ohio
Filed Oct. 29, 1964, Ser. No. 407,396
6 Claims. (Cl. 119—25)

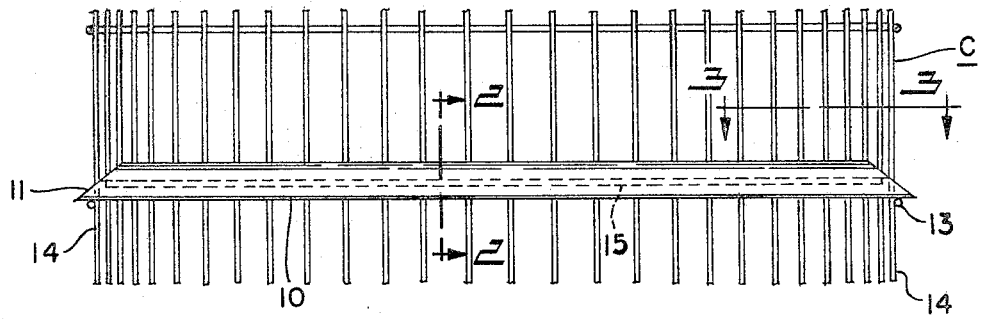
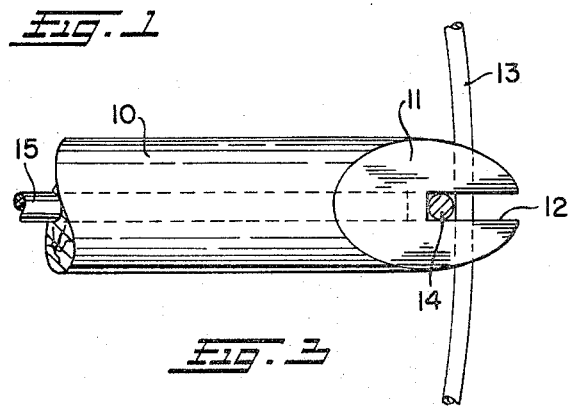
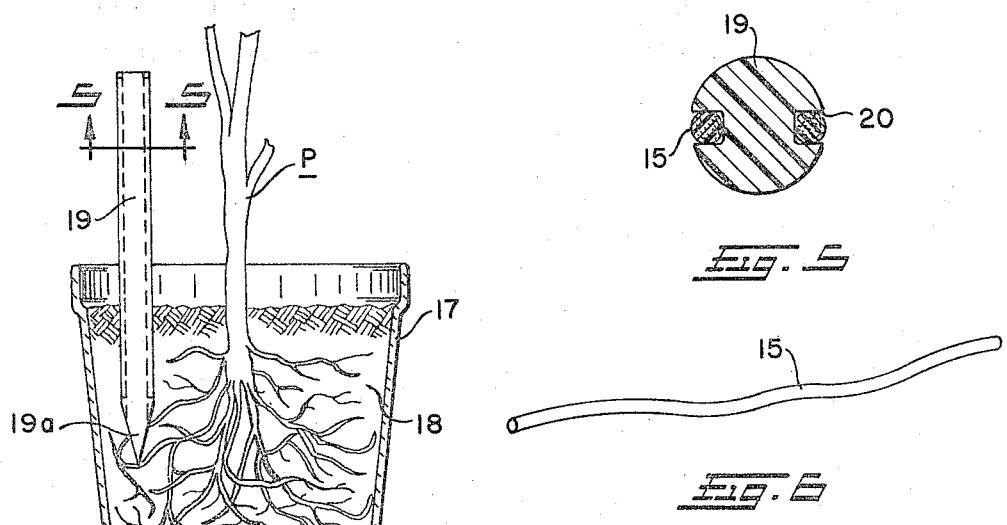

The present invention relates to a biocidal device and, more particularly, to a device capable of emitting an ectobiocidal vapor in the vicinity of living matter.

Not only animals, such as pets or farm animals, but also vegetation such as ornamental plants, are subject to attack from a variety of natural enemies, for example, bacteria, parasites, insects, etc., such as mites, ticks, lice, spiders, moths, ants, flies, gnats, mosquitos, and the like. A number of chemical compounds are known which are toxic to these pests and are usually applied directly to an animal or vegetation such as by dusting in powder form or by spraying in liquid or solution form. A technique has not previously been known in which the application of a toxic material can be varied, not only in amount of application and/or area of application but, in either case, to be substantially uniformly effective as well over a prolonged period of time.

It is, therefore, a principal object of the present invention to provide an improved biocidal device.

Another object is to provide a portable carrier for a biocide which can be associated in close proximity with various living matter to be protected.

A further object is to provide a biocidal device which emits a vapor and is effective over a prolonged period of time.

Additional objects and advantages are apparent from the drawings and following description wherein:

FIGURE 1 is a horizontal, truncated section of a conventional cylindrical bird cage or the like, showing one embodiment of the present invention as a cage perch for a bird;

FIGURES 2 and 3 are sections of FIGURE 1 on the lines 2—2 and 3—3, respectively;

FIGURE 4 is a vertical section of a potted plant showing a modified form of the present invention for use with vegetation;

FIGURE 5 is a section of FIGURE 4 on the line 5—5; and

FIGURE 6 is a perspective view of a biocide-impregnated resinous strand that may be used in the embodiments of FIGURES 1 through 5.

As used here and in the claims, the term "biocide" is intended generically to include all known toxic materials effective to kill or control all types of pests, depending on the particular application and results sought. Accordingly, "biocide" includes without limitation all known fumigants, parasiticides, insecticides, bactericides, fungicides, and the like, the useful biocides for the purposes of the invention being volatile as hereinafter noted. Further, as used here and in the claims, the term "strand" is intended generically to include all related forms such as a filament, fiber, rope, cord, yarn, ribbon, and the like, whether composed of a single, unitary strand or a bundle or rove of such strands commingled or consolidated by twisting, braiding, plaiting, or the like.

The present biocidal device comprises a carrier having a strand containing a biocide effective to emit a vapor. As such, the device is portable and may be placed singly or in any desired number at or about a point of use. For example, the portable device can be placed in various farm areas such as horse barns, dairy barns, calf barns, milk sheds, pig pens, poultry houses, chicken pens, dog kennels, and the like. Similarly, the present biocidal device is useful within or about the home to control flies, mosquitos, spiders, etc., or within a clothes closet to combat moths, etc. Two specific embodiments are illustrated by the figures. One embodiment is designed for home pets, such as a parakeet or canary; and the other embodiment is designed for vegetation such as a potted plant, as hereinafter more fully described.

In general, the carrier of the biocidal device is of a shape convenient not only for exposing a sufficient area of the strand (and accordingly for diffusing a suitable quantity of biocide vapor therefrom); but also for readily installing the device at a point of use, whether in a bird cage or potted plant or elsewhere. For this purpose the carrier is elongated and preferably in the form of a rod having a surface slot or groove to receive the biocide in the form of an impregnated strand. The rod is not limited to any particular material. Although wood and plastic are presently preferred for this purpose, other materials such as artificial wood, metal, or heavy cardboard, or combinations of any of these materials may suitably be used.

As indicated, the biocide of the present invention may be any known toxic material for this purpose. The chemical composition of the biocide is, therefore, not critical. This material merely forms a mechanical combination with the other parts of the present device as herein defined. However, in accordance with the present invention, the biocide must be sufficiently volatile under conditions of use to emit a vapor, such as under normal room temperatures. The volatility need not be great. Merely as an illustration, biocides useful in the present invention may have a relatively low vapor pressure of from about $1 \times 10^{-8}$ to about $1 \times 10^{-4}$ mm. of mercury, at temperatures falling within the range of from about 0° F. to about 125° F., and preferably from about 40° F. to about 100° F. Although such biocidal compounds are not particularly highly volatile, this is not a disadvantage since the strand which contains them can emanate a vapor over extended periods of time (which may be six months or more) at a substantially constant, sustained concentration that is sufficiently high to be active in attacking a variety of pests.

Among the biocides which may be used are the following:

1,1,1-tri-chloro-2,2-bis (parachlorophenyl)ethane (DDT)
2,2-bis (paramethoxyphenyl)-1,1,1-trichloroethane (DMDT)
gamma isomer of 1,2,3,4,5,6-hexachlorocyclohexane (lindane)
1,2,4,5,6,7,8,8-octachloro-4,7-methano-3',4,7,7'-tetrahydroindane
1,2,3,4,10,10-hexachloro-1,4,4',5,8,8'-hexahydro-1,4,5,8-dimethanonaphthalene (aldrin)
1,4,5,6,7,8,8-heptachloro-3'4,7,7'-tetrahydro-4,7-methanoindene (heptachlor)
1,2,3,4,10,10-hexachloro-6,7-epoxy-1,4,4',5,6,7,8,8'-octahydro-1,4-endo,exo-5,8-dimethanonaphthalene (dieldrin)

1,2,3,4,10,10-hexachloro-6,7-epoxy-1,4,4',5,6,7,8,8'-octa-
hydro-1,4-endo,endo-5,8-dimethanonaphthalene
(endrin)
chlorinated camphene
bentachlorophenol
hexaethyl tetraphosphate (HETP)
tetraethyl pyrophosphate (TEPP)
0,0-diethyl-para-nitrophenyl thiophosphate (parathion)
0,0-diethyl-0-(2-isopropyl-6-methyl-4-pyrimidinyl thio-
phosphate) (Diazinon)
0,0-dimethyl dithiophosphate of diethyl mercaptosuccinate
(malathion)
0,0-dimethyl-1-hydroxy-2,2,2-trichloroethylphosphonate
(Dipterex)

Particularly useful biocides are disclosed in U.S. Patent 2,956,073 which is hereby incorporated by reference. The biocides of this patent are of the dichlorovinyl dialkyl phosphate class, as exemplified by 2,2-dichlorovinyl dimethyl phosphate.

In certain instances, it may be desirable to add small amounts (up to 10 percent by weight of the biocide and preferably from about 1 percent to about 4 percent) of other ingredients of a biocidal character which are more volatile than the main biocidal constituent. These relatively more volatile compounds temporarily provide a vapor having increased killing intensity.

Stabilizers and other ingredients may also be added to the biocide-forming composition in minor amounts (for example, from about 0.1 percent to about 3 percent by weight of the biocide). Examples of stabilizers include betanaphthol, which is especially effective in stabilizing dichlorovinyl dimethyl phosphate.

Small amounts may be added of other ingredients inert to the active ingredients which vaporize or sublimate at temperatures in the previously disclosed range. Paradichlorobenzene or naphthalene are examples of useful ingredients which do not harm the function of most active biocidal ingredients and have a useful insect repellent action. They also seem to have a gasifying or carrier function facilitating the escape of vapors of active ingredients of minimum volatility. Perfumes or deodorants may be added to counteract any undesirable odors from the active ingredients present.

The material constituting the "strand" of the present invention may likewise be selected from a variety of substances, since this material serves only a mechanical function of being a bearer for the biocide. Thermoplastic resins have been found to be very well suited for this purpose. Exemplary of the thermoplastic resins which may be used are: polyethylene, polypropylene, polystyrene, polyvinyl chloride, polyvinylidene chloride, polytetrafluoroethylene, polymethacrylates, polyamides (nylon), and the like.

To prepare the biocide-impregnated strand, a preformed plastic or resinous strand may be pressure or vacuum impregnated with the biocide by techniques known in the art. Alternatively, the biocide can be admixed with the thermoplastic material and the resulting admixture then extruded into strand form, this operation being carried out at as low a temperature and at as high an extruding pressure as convenient to avoid loss of the biocide. Optionally, an expected, unavoidable loss of biocide due to the extrusion operation can be compensated for by initially increasing the amount of biocide admixed with the resinous material an amount approximately equal to that expected to be lost.

The concentration of the biocide in the resinous strand depends upon many factors, such as the particular biocide employed, the conditions of application, the pest species to be controlled, and the like. The proper consideration of these and other factors are all within the knowledge of those skilled in the art. In general, for purposes of illustration, the biocide can be effective in concentrations as low as 0.01 percent by weight of the strand; and can be used in amounts as high as 20 percent by weight of the strand. This range, of course, is by no means critical to the invention.

Preferably, the biocide-impregnated strand is frictionally retained within a groove or surface slot on the carrier or rod. This may be accomplished by employing a strand and slot having a substantially uniform thickness and width, respectively, and the strand thickness being somewhat oversized with respect to the width of the slot. By tensioning or stretching the strand, its thickness is sufficiently reduced or slenderized to permit insertion of the strand within the slot. Upon then releasing the tension, the strand expands laterally to be gripped by the sides of the slot and thereby become frictionally locked in place. The strand may thus be securely so retained in the slot even with the rod mounted in use with the slot extending vertically as in FIGURE 4, or extending horizontally but opening downwardly, as shown in FIGURE 1.

Referring to the drawings, FIGURES 1 through 3 illustrate the invention in the form of a perch for a bird. A wooden rod 10 has substantially converging beveled end surfaces 11 and end slots 12 which extend through the beveled end surfaces. The end slots aid in supporting the rod 10, preferably at both of its ends by receiving vertically extending cage wires 14 while the ends of the rod rest on a horizontal cage wire 13, the horizontal and vertical wires being normally fixed to each other at points of intersection, as by spot welding. The distance between the two vertical wires 14 at opposite ends of the rod 10 in FIGURE 1 represents one cage dimension which the rod 10 may span. Any two vertical wires 14 on opposite sides of a cage (or on different walls of a square or rectangular cage) having approximately this spacing may be similarly spanned, so long as opposite ends of the rod rest on a horizontal wire 13 while the end slots receive wires 14 and restrain the rod against axial rotation and excessive longitudinal movement. While the rod is tilted upwardly at one end, with the opposite end receiving a vertical wire 14 in its end slot, the slot in the elevated end may be slid down around or upwardly away from any other vertical wire 14 that is the proper distance from its cooperating counterpart.

A biocide-impregnated resinous strand 15 of the present invention is embedded in the rod 10 below its outer surface. Preferably, a slot or groove 16 extends longitudinally along and into the rod 10 to provide a downwardly opening nesting groove for the strand 15 and simultaneously form the end slots 12. As can readily be seen from the drawings, the depth of the longitudinal slot 16 and bevel angle at the ends of the rod, which may be formed in any desired order, determine the axial depth of the end slots 12. The depth of the longitudinal slot 16 should be enough for the strand 15 to be located well in from the outer rod surface. This construction greatly simplifies the manufacture of the rod while at the same time providing all needed features for secure mounting of the rod, as illustrated and described, in cages of a variety of sizes and shapes while keeping the strand 15 well out of reach of a bird in the cage and permitting vapor to escape from the strand.

FIGURES 4 and 5 illustrate an embodiment adapted for use with living vegetation. A pot 17 contains a plant P and nutrient soil 18. A plastic rod 19 has a pointed end 19a to facilitate its insertion into the soil 18. This embodiment also illustrates the use of a multiplicity of slots 20, two slots being here shown with each containing a biocide-impregnated resinous strand 15. A plurality of strands may be used when it is desired to increase the concentration of a biocidal vapor, or when some of the strand is substantially inactivated as by immersion in soil or the like, as shown in FIGURE 4.

In either embodiment, the exposed surface areas of the strand permit the impregnated, volatile biocide to be slowly and continuously released over a prolonged period of time. Since even the densest of solid plastics have pronounced vapor transmission characteristics, volatile or gaseous materials may be impregnated or infused therein and similarly released therefrom.

In packaging a biocidal device of the invention, the carrier, such as the rod 10 or 19, should be enveloped by a sealed, gas-impervious container to prevent premature release of the biocidal vapor. For example, the carrier may be packed within a tube of glass or metal foil.

While the foregoing description discloses several embodiments of the present invention, it is understood that the invention may be practiced in still other forms within the scope of the accompanying claims.

What is claimed is:

1. A portable biocidal device adapted to be associated in proximity with living matter to be protected from pests, said device comprising a rod-like member having a groove of substantially uniform width extending a substantial distance into and along the member, and an elastic, solid resinous strand of substantially uniform thickness greater than the width of said groove when the strand is in an initial unstressed condition, said strand extending in an elastically, laterally compressed condition between side walls of the groove so as to hold the strand within the groove entirely by frictional engagement of the strand with opposite side walls of the groove resulting from said laterally compressed condition of the strand, the strand being impregnated along the length thereof with a lethal amount of a vapor-diffusing biocide toxic to said pests.

2. A method of assembling a biocidal device from an elongated carrier comprising the steps of: forming a groove of substantially uniform width in and along the carrier, elastically tensioning a resinous strand carrying an effective amount of a volatile biocide and normally having a thickness somewhat greater than said groove width until the thickness of the strand is reduced to less than said groove width, inserting the strand while still under tension into the groove, and then releasing the tension on the strand whereby the strand expands laterally and is frictionally retained within said groove.

3. A biocidal device according to claim 1 in which said rod-like member has one end tapered to facilitate inserting it into the ground.

4. A perch for a bird or the like comprising a rod having a longitudinal groove extending into one side of the rod from end to end thereof, opposite ends of the rod being beveled on a side opposite the grooved side to produce end portions of a thickness not exceeding the depth of the groove so that the groove extends completely through said end portions to form end slots extending longitudinally into said end portions for receiving vertical cage elements while the rod adjacent the end slots rests on horizontal cage elements, whereby both ends of the rod may be so mounted on and securely held by such cage elements with the longitudinal groove opening downwardly and a biocidal, vapor-releasing solid strand frictionally held in said groove in a location substantially inaccessible to a bird sitting on the perch.

5. A perch according to claim 4, including an elastic strand extending in an elastically, laterally compressed condition between sidewalls of the longitudinal groove for frictionally holding the strand within the groove, said strand being impregnated along the length thereof with a lethal amount of a vapor-diffusing biocide toxic to animal-infesting pests.

6. A perch according to claim 4, including a solid strand of elastic plastic material extending in an elastically, laterally compressed condition between sidewalls of the longitudinal groove for frictionally holding the strand within the groove, said strand being impregnated along the length thereof with a lethal amount of a vapor-diffusing biocide toxic to animal-infesting pests.

References Cited by the Examiner

UNITED STATES PATENTS

| | | | |
|---|---|---|---|
| 342,894 | 6/1886 | Baxter | 119—25 |
| 413,507 | 10/1889 | Halstead. | |
| 1,209,462 | 12/1916 | Mack | 119—25 |
| 1,349,031 | 8/1920 | Windahl | 119—25 |
| 1,461,440 | 7/1923 | Centerbar | 20—92 |

SAMUEL KOREN, *Primary Examiner.*

HUGH R. CHAMBLEE, *Examiner.*